Sept. 19, 1933.  R. A. BEACH  1,927,253
DRINK MIXER
Filed July 18, 1932
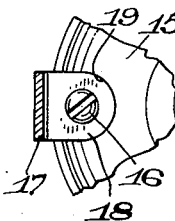
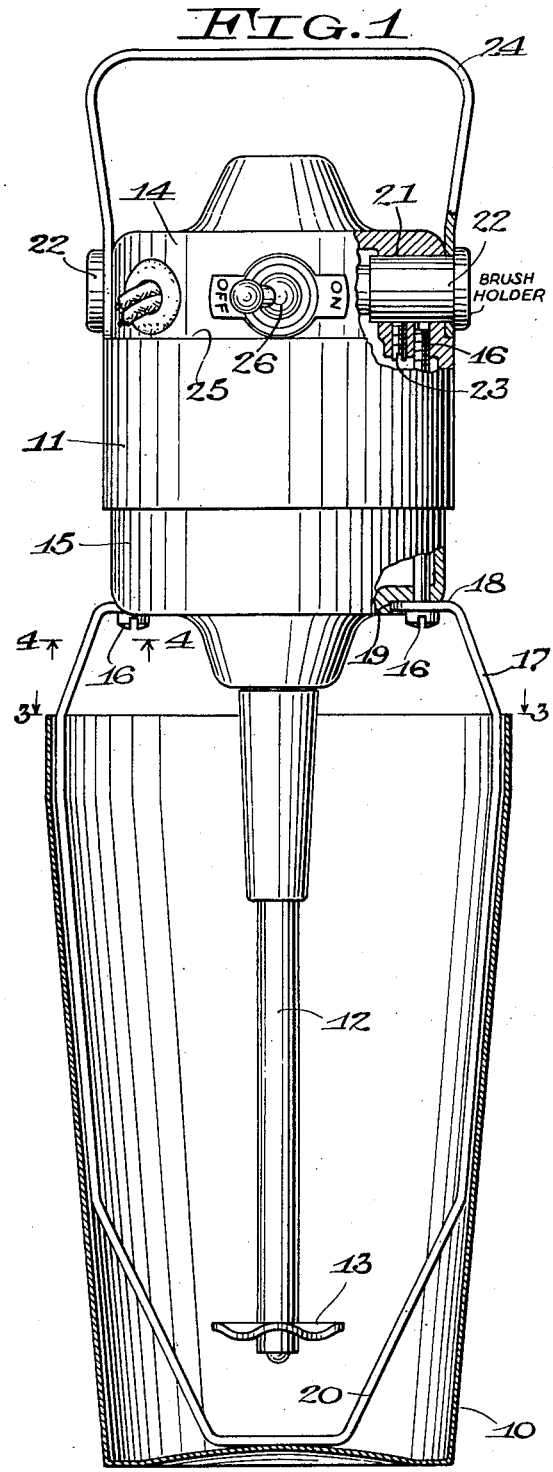
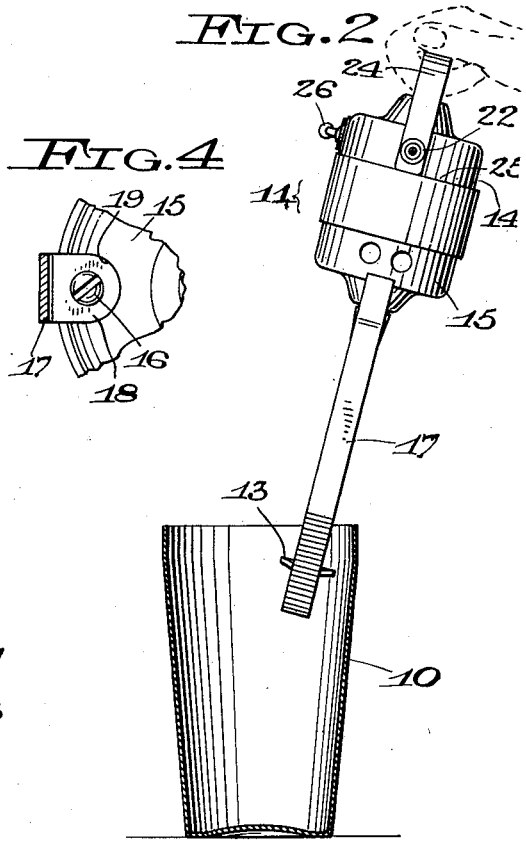
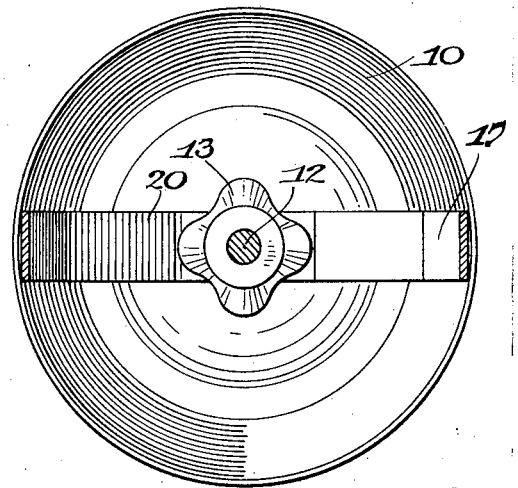
INVENTOR
Royal A. Beach
By R. S. Caldwell
ATTORNEY
WITNESSES
L. E. Kilian
C. L. Waal Patented Sept. 19, 1933

1,927,253

UNITED STATES PATENT OFFICE 1,927,253

DRINK MIXER

Royal A. Beach, Racine, Wis.

Application July 18, 1932. Serial No. 623,066

3 Claims. (Cl. 259—108)

This invention relates to drink mixers and the like, and has for an object the provision of an improved drink mixer which is of simple and durable construction, capable of being inexpensively manufactured and easily cleaned and well adapted for use in the house, the device being useful for various mixing and aerating purposes, such as whipping cream, beating eggs, and preparing liquid or semi-liquid food mixtures.

Another object of the invention is to provide a drink mixer in which a receptacle removably supports a motor-driven agitator having a receptacle-engaging frame which enters the receptacle to break up vortex action and to furnish a mixing or beating effect, the frame serving as a guard to prevent striking of the agitator shaft when the agitator is introduced into or removed from the receptacle.

A further object of the invention is to perfect details of construction generally.

The invention further consists in the several features hereinafter described and claimed.

In the accompanying drawing Fig. 1 is a sectional elevation of a drink mixer embodying the invention;

Fig. 2 is another sectional elevation of the device showing the agitator partially entered in the receptacle, Fig. 3 is a sectional view taken along the line 3—3 of Fig. 1, and Fig. 4 is a detail sectional view taken along the line 4—4 of Fig. 1.

In the drawing, 10 designates a mixing cup or receptacle constructed of any suitable material such as sheet metal, the bottom wall being inwardly dished and the side walls being slightly tapered and upwardly diverging and provided with a cylindrical rim portion for re-enforcement.

An electric motor 11 carries and drives a depending agitator shaft 12 having an agitator or stirring element 13 at its lower end. The motor is provided with upper and lower housings or casings 14 and 15 respectively which are secured together by headed screws 16 extending longitudinally of the motor and threaded into the upper housing.

A U-shaped frame or bracket 17, formed of a bent metal strap, is disposed in the plane of the agitator shaft with its leg portions at opposite sides of the shaft, and is provided with inturned rounded apertured ears 18 at its upper end fitting in recesses 19 formed in the lower motor housing 15 and rigidly secured to the motor by the screws 16. The leg portions of the frame 17 are sloping to fit the side walls of the receptacle and are preferably slightly resilient. The lower end of the frame 17 is adapted to rest on the dished bottom wall of the receptacle, and the adjacent parts 20 of the leg portions, as seen in Fig. 1, slope at such an angle as to be spaced from the side walls of the receptacle. The frame parts 20 serve to break up vortex action in the receptacle and also provide a whipping or beating action on the contents of the receptacle. The upper parts of the frame within the receptacle also reduce the vortex action. For stability and compactness the agitator shaft is disposed coaxially of the receptacle and the motor is close to the upper end of the receptacle.

The upper motor housing 14 is provided with diametrically aligned bores 21 into which headed brush holders 22 are pressed and additionally secured by set screws 23. A bail or handle 24 formed of a bent metal strap has apertured end portions receiving the brush holders 22 therethrough, the heads or flanges of the brush holders clamping the bail to the motor housing 14. The ends of the bail are squared to engage a shoulder 25 on the motor housing 14 and thus prevent rotation of the bail. A motor switch 26 is mounted in the upper motor housing 14.

In use, the agitator is removed from the receptacle to permit introduction into the receptacle of the ingredients to be mixed or whipped. The agitator is then inserted into the receptacle, the bail 24 being held in the hand. The agitator may be inserted at a considerable angle to the axis of the receptacle, as indicated in Fig. 2, the frame or bracket 17 forming a guard engageable with the curved walls of the receptacle to prevent striking of the agitator element 13 on the receptacle and to avoid possible misalignment of the agitator shaft. The cam action of the frame or bracket on the curved walls of the receptacle acts to center the agitator in the receptacle as the agitator approaches its operative position, and the agitator is retained in such position by the frictional engagement of the bracket with the walls of the receptacle. The yielding of the leg portions of the frame 17 permits bottoming of the frame of the receptacle without danger of binding. The walls of the receptacle may also be made resilient to accomplish the same purpose. The inserted agitator is supported by the receptacle and is set in operation to mix or aerate the contents of the receptacle, the frame 17 acting to break up the vortex action and also exercising a mixing and beating function on the moving liquid. After the mixing operation the agitator is lifted from the receptacle to permit pouring of the receptacle contents. The construction of the device is such that it can be easily and thoroughly cleaned.

What I claim as new and desire to secure by Letters Patent is:

1. In a drink mixer or the like, the combination of a receptacle, a motor having a depending agitator adapted to enter said receptacle, and a loop-shaped guard member secured to said motor and having portions arranged at opposite sides of said agitator for engaging the inner walls of said receptacle, said guard member having lower downwardly converging portions spaced from said walls.

2. In a drink mixer or the like, the combination of a motor having a rotary agitator, and an integrally formed loop-shaped guard bar lying substantially in the axial plane of said agitator and having upper portions secured to said motor and downwardly converging leg portions disposed at opposite sides of said agitator and adapted to engage the inner side walls of a container for supporting the motor.

3. In a drink mixer or the like, the combination of a container, a motor having a depending agitator adapted to enter the container, and an agitator-guarding bracket secured to said motor and having resilient leg portions releasably engageable with the inner walls of the container for supporting the motor, the lower ends of said leg portions converging downwardly away from the container side walls.

ROYAL A. BEACH.